Feb. 22, 1938.   K. O. ZEIGLER ET AL   2,109,079
BROILING APPARATUS
Filed Aug. 10, 1935   2 Sheets-Sheet 1
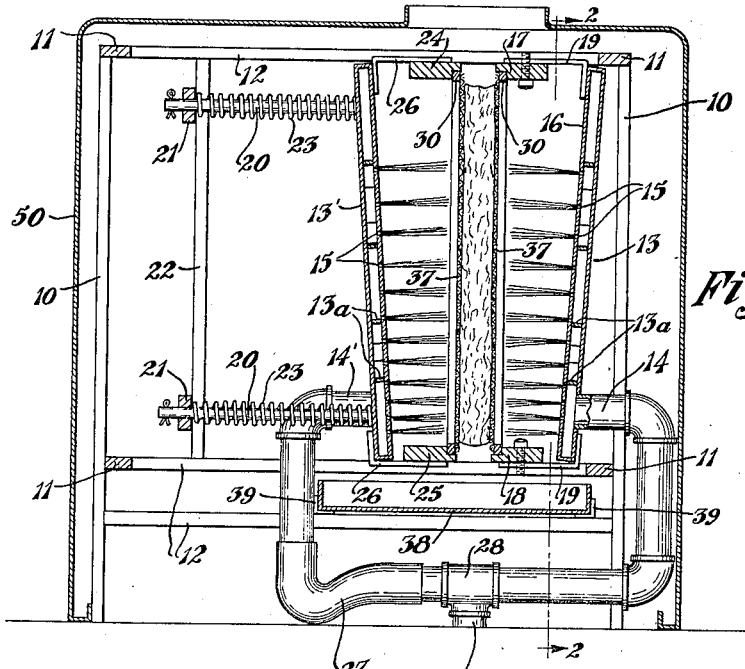
Fig. 1
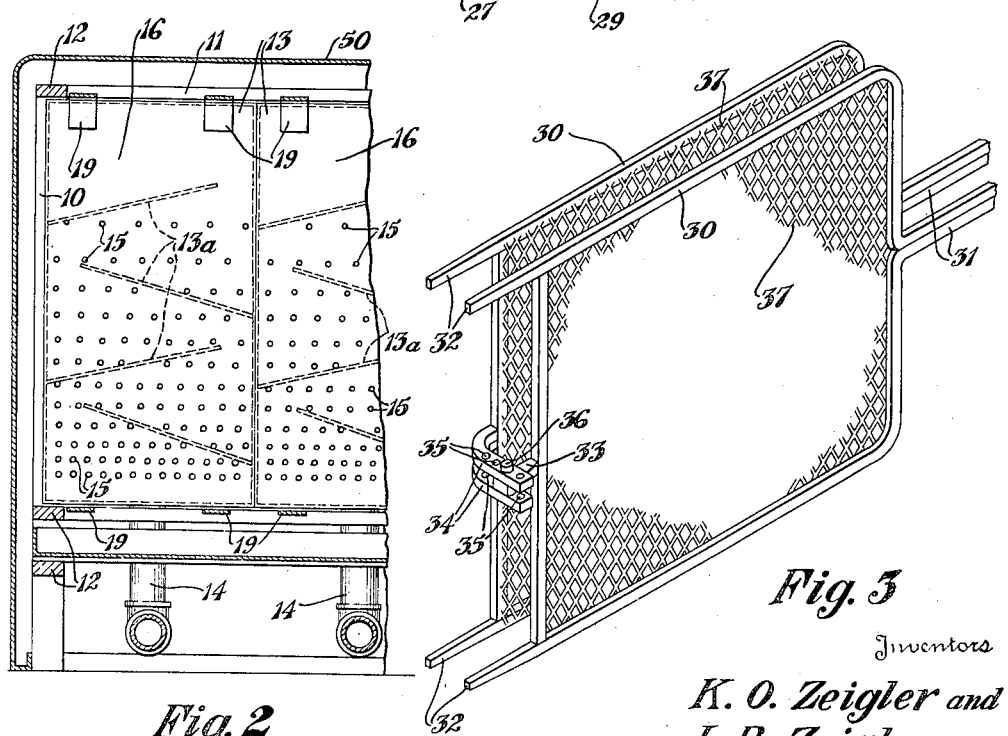
Fig. 2
Fig. 3
Inventors
K. O. Zeigler and
J. B. Zeigler
By Frease and Bishop
Attorneys Feb. 22, 1938.　　K. O. ZEIGLER ET AL　　2,109,079
BROILING APPARATUS
Filed Aug. 10, 1935　　2 Sheets-Sheet 2
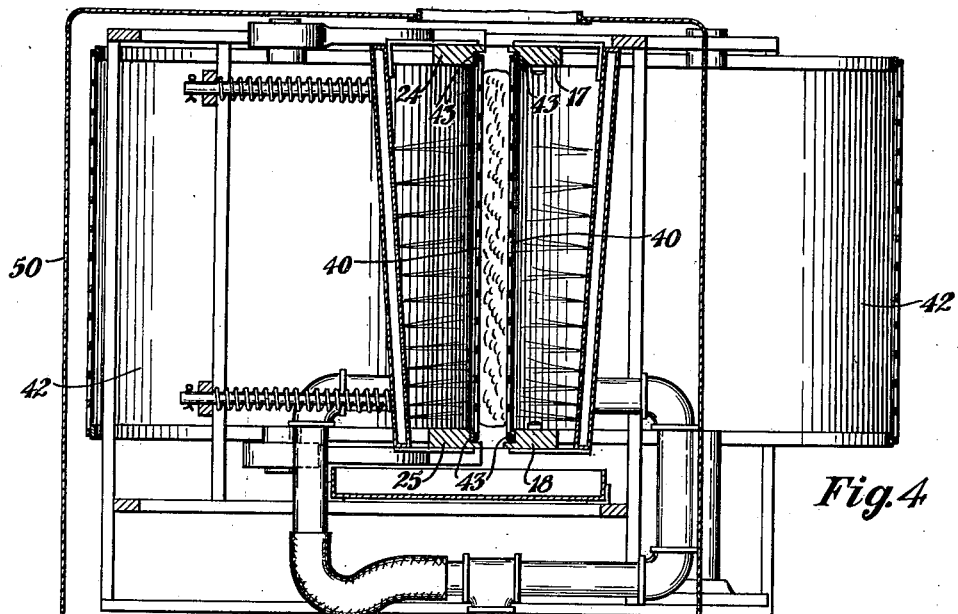
Fig. 4
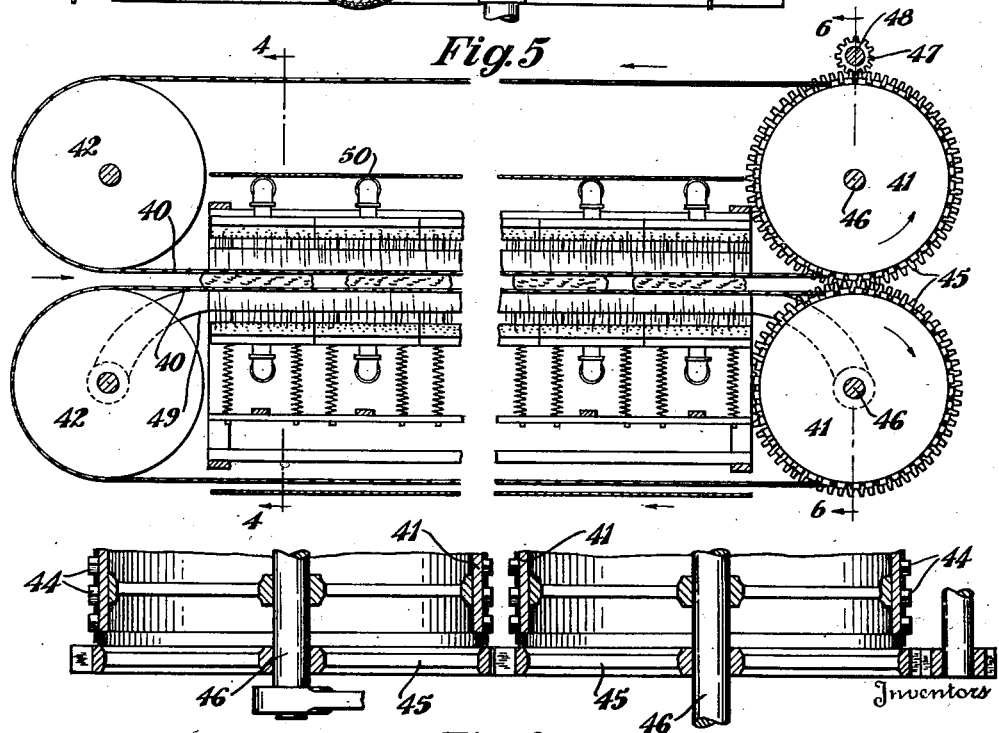
Fig. 5
Fig. 6
Inventors
K. O. Zeigler and
J. B. Zeigler Patented Feb. 22, 1938

2,109,079

UNITED STATES PATENT OFFICE 2,109,079

BROILING APPARATUS

Kenneth O. Zeigler and Jacob B. Zeigler, Salem, Ohio

Application August 10, 1935, Serial No. 35,640

4 Claims. (Cl. 158—114)

The invention relates to apparatus for broiling or grilling meat and the like and more particularly to a device of this kind in which the meat is simultaneously broiled upon both sides.

An object of the improvement is to provide a broiling apparatus having fixed heating means on one side and movable heating means on the other side of the food to be broiled, means being provided for adjusting the movable heating means whereby the food is always exactly centrally located between the two heating means.

A further object is to provide means for automatically adjusting the position of the movable heating means as the food to be broiled is inserted into the apparatus.

Another object is to provide means for evenly cooking the entire surfaces of both sides simultaneously.

A further object of the improvement is to provide an apparatus for cooking the meat in vertical position, the heating means being flared outwardly away from the meat toward the upper end.

A still further object is to provide heating means graduated from bottom to top so that the greatest amount of heat is liberated at the lower portion and the minimum amount at the upper portion of the heating means.

Another object of the improvement is to provide a movable foraminous food rack or grill whereby the broiling or grilling operation may be continuous.

Another object is to provide a foraminous food rack or grill to receive the meat or other food to be broiled and arranged to be inserted between the heating means, and so arranged that it may be adjusted to receive cuts of meat of varying thickness.

The above objects together with others which will appear from the drawings and following description or which may be hereinafter pointed out may be attained by providing a fixed heating means and a movable heating means spaced therefrom, the heating means being inclined away from each other toward their upper ends and arranged so as to liberate the greatest amount of heat at their lower ends, fixed guides being associated with the upper and lower ends of the fixed heating means and movable guides being associated with the upper and lower ends of the movable heating means to receive a foraminous food rack or grill therebetween, the apparatus being so constructed that as the food rack is inserted the movable heating means is automatically adjusted to the same distance from that side of the food rack as the fixed heating means on the opposite side thereof.

In carrying out the continuous operation of broiling or grilling the food, a movable grill or food rack may be provided which if desired may, as shown in the drawings, comprise a pair of foraminous endless belts arranged to be continuously passed through the guides between the heating means to continuously carry the food therethrough.

An embodiment of the invention thus set forth in general terms is illustrated in the accompanying drawings, in which—

Figure 1 is a vertical transverse sectional view through a broiling apparatus constructed in accordance with the invention;

Fig. 2, a fragmentary longitudinal section taken as on the line 2—2, Fig. 1;

Fig. 3, a detached perspective view of the adjustable food rack or grill for receiving the meat or other food to be broiled;

Fig. 4, a transverse sectional view similar to Fig. 1, showing the continuous form of the apparatus, on the line 4—4, Fig. 5;

Fig. 5, a diagrammatic plan sectional view of the continuous broiling apparatus; and Fig. 6, a fragmentary detail section of the driving means for the continuous broiling apparatus on line 6—6, Fig. 5.

Similar numerals refer to similar parts throughout the drawings.

Referring first to the form of the invention shown in Figs. 1 to 3 inclusive, a frame may be constructed for supporting the apparatus, including the uprights 10, longitudinal members 11 and transverse members 12. For the purpose of illustration, gas burners are shown for providing heat to cook the food but it should be understood that gas, electric or any other suitable form of heating means may be provided without departing from the invention.

One or more fixed gas burners generally indicated at 13 may be located within the frame near one side thereof, each burner being preferably in the form of a hollow rectangular box having a fixed gas supply pipe 14 communicating with its rear side near the lower end thereof. The front face of the gas burner is provided with a plurality of gas jet apertures 15 which are preferably arranged as shown in Fig. 2, the apertures being closer together and more numerous at the lower portion of the burner and further spaced apart toward the upper end of the burner, the top portion of the burner, as indicated at 16, being preferably imperforate as shown.

Each of the fixed gas burners is preferably inclined outward toward its upper end as best shown in Fig. 1 so as to be spaced further from the food than the lower end thereof. This arrangement, together with the spacing of the gas jet apertures above referred to, provides for an even heat over the entire surface of the meat as the natural tendency is for the gas within the hollow burner, as well as the heat of the flame projected therefrom, to rise toward the top of the burner.

Fixed upper and lower guides 17 and 18 respectively are provided, being preferably carried by the burner as by means of the brackets 19 so that the relation between the guides and burner remains constant.

One or more movable burners indicated generally at 13' may be located within the frame spaced from the fixed burner or burners. Each movable burner is of the same construction as the fixed burner above described and located in the oppositely inclined position and provided with a similar arrangement of gas jet apertures 15.

Each movable burner is carried upon a pair of transversely slidable rods 20 mounted through bars 21 carried by the uprights 22 connected to spaced upper and lower transverse members 12, a coil spring 23 being located around each of the rods 20 and interposed between the burner and the corresponding bar 21 to normally urge the movable burner toward the fixed burner.

Each of the movable burners has the upper and lower guides 24 and 25 respectively associated therewith so that the guides and burner move as a unit. For this purpose, the guides 24 and 25 may be connected to the upper and lower portions of the movable burner as by the brackets 26, whereby there is no relative movement between the burner and guides but the entire structure of movable burner and guides moves as a unit.

Gas is admitted to the lower rear portion of each movable burner through a gas pipe 14' which may be connected as by the flexible hose 27 to one side of the T-coupling 28, the fixed gas pipe 14 being connected to the other side thereof and gas being admitted to the T from any suitable source of supply as through the pipe 29. This insures uniform distribution of gas from the pipe 29 to each fixed and movable burner.

The meat to be broiled is adapted to be placed in a foraminous food rack or grill shown in Fig. 3. This rack comprises two similar hinged sections, each of which may include a substantially rectangular frame 30 having a handle portion 31 at one end and tapered fingers 32 at the upper and lower edges of its other end.

At this same end of the rack is provided a hinge connection including a lug 33 formed midway between the top and bottom of the edge of one frame and a pair of angular ears 34 formed upon the other frame and provided with a plurality of apertures 35 to selectively receive a hinge pin 36 which extends through a suitable aperture in the lug 33. With this construction the food rack can be adjusted to accommodate cuts of meat of varying thickness. Each member of the rack may be formed of any suitable foraminous material such for instance as a sheet of diamond mesh indicated at 37 welded or otherwise secured to the frame 30.

It should be understood that both the frame portion and foraminous material of the rack are preferably formed of a suitable heat resisting alloy.

When it is desired to broil meat or the like, the gas burners are lighted and the gas adjusted to the desired flame, it being understood that a suitable valve may be provided in the pipe 29 to control the gas supply to the burners. The meat is placed in the food rack, which is then inserted into the fixed and movable guides as shown in Fig. 1, the tapered fingers 32 of the food rack facilitating the easy insertion of the rack into the guides.

It will be seen that as the food rack is thus positioned, the movable burner 13' will be spaced from the adjacent side of the food rack the same distance as the fixed burner 13 is permanently spaced from the other side thereof, the food rack positioning the movable guides 24 and 25 to automatically adjust the position of the movable burner 13'.

The intense heat from the burners on opposite sides of the food rack will instantly sear both surfaces of the meat so as to preserve the natural juices within the meat. Owing to the outwardly inclined position of the burners toward their upper ends and the location of the gas jet apertures therein, an even uniform heat will be distributed over each entire surface of the meat so as to uniformly broil the meat throughout.

Both surfaces of the meat are almost instantly seared so that very little grease or juice drips from the meat, but in order to catch what small amount of drippings there may be, a drip pan 38 may be slidably located in the guides 39 carried by the frame below the food rack. This pan may be removed from time to time for cleaning.

In Figs. 4 to 6 inclusive of the drawings is illustrated an application of the invention to a continuous broiling apparatus. The frame, burners, guides, and piping may all be substantially the same as illustrated in Figs. 1 and 2 and they are designated by the same reference numerals applied to Figs. 1 and 2.

The frame, however, is of considerably greater length than that provided for the form of the invention shown in Figs. 1 to 3 inclusive, being probably four or five feet long in the average case and requiring a multiplicity of fixed and movable burners.

Instead of providing a stationary food rack or grill to receive the meat and to be inserted and held in stationary position between the burners, a movable food rack or grill is provided which may be in the form of two endless foraminous belts indicated generally at 40 which may be formed of a diamond mesh expanded metal such as shown at 37 in Figs. 1 and 3, each belt passing around the drums 41 and 42 at opposite ends of the apparatus.

Each of the foraminous sheets 40 may be provided at its upper and lower edges with a spring steel strip 43 welded or otherwise attached to the expanded metal sheet and adapted to slide within the upper and lower guides 17, 24 and 18, 25 respectively in the manner best shown in Fig. 4.

Each of the drums 41 may be in the form of a sprocket drum as shown in Figs. 5 and 6, being provided around its periphery with a plurality of sprocket teeth 44 which may be diamond shaped to conform to the mesh of the expanded metal belts 40 and so spaced as to be received in the diamond shaped apertures thereof. Both of these drums 41 may be geared together by means of the gears 45 fixed upon the shafts 46 of the drums 41, said gears meshing as shown in Figs. 5 and 6.

For the purpose of driving the sprocket drums at the proper rate of speed, a pinion 47 may mesh with one of the gears 45, the pinion being fixed upon a drive shaft 48 which may be driven from any suitable source of power, preferably through a gear reduction or the like, not shown.

In order to compensate for different thicknesses of steak passing between the drums 41 and 42, the shafts 46 of the drums carrying one belt may be journaled in a movable bracket 49 which is connected to the movable burners and guides whereby the rolls will be automatically adjusted to accommodate the thickness of the meat passing through the broiler.

For the purpose of permitting this movement of the movable driving drum 41 relative to the other driving drum 41 without disturbing the drive means, the teeth upon the gears 45 may be sufficiently long to permit relative movement of the drums without moving the gears out of mesh with each other.

In the operation of the continuous apparatus, cuts of meat are placed between the belts at the left-hand end of the apparatus as viewed in Fig. 5, the belts traveling in the directions of the arrows shown on said figure. The meat is carried through the apparatus as indicated in this figure, the foraminous belts riding in the fixed and movable guides, adjusting the movable guides and movable burner therewith to the thickness of the meat so that the movable burners are spaced the same distance from the meat as the fixed burners.

The speed of the belts is such that with one pass through the apparatus the meat is completely cooked. It should be understood of course that the speed may be adjusted to provide for the broiling of different kinds of meat or different thicknesses of cuts of meat or for broiling rare, medium or well done as may be desired, by regulating the speed of the drive.

In order to prevent the gas from rising too rapidly to the tops of the burners, a series of oppositely inclined baffle plates 13a may be provided within each of the hollow burners 13 and 13', whereby a sufficient amount of gas is caused to issue from the gas jet apertures in the lower portions of the burners to produce the desired result.

A hood 50, of sheet metal or the like, may be located around the broiler and provided with a suitable vent for connection of a stovepipe or the like to carry away smoke and fumes of the cooking food.

We claim:

1. A spaced pair of hollow, flat, upright gas burners adapted to receive a food rack therebetween, each burner having a plurality of apertures in its inner wall, the spacing of the apertures increasing toward the top of the burner, and staggered baffle plates located one above the other within said hollow burner and having their ends alternately spaced from opposite edges of the hollow burner, and means for admitting gas to the lower portion of the burner.

2. A spaced pair of hollow, flat, upright gas burners adapted to receive a food rack therebetween, each burner having a plurality of apertures in its inner wall, the spacing of the apertures increasing toward the top of the burner, and staggered, oppositely inclined baffle plates located one above the other within said hollow burner and having their upper ends spaced from the adjacent edges of the hollow burner.

3. A spaced pair of upwardly and outwardly inclined, hollow, flat, upright gas burners adapted to receive a food rack therebetween, each burner having a plurality of apertures in its inner wall, the spacing of the apertures increasing toward the top of the burner, and staggered baffle plates located one above the other within said hollow burner and having their ends alternately spaced from opposite edges of the hollow burner, and means for admitting gas to the lower portion of the burner.

4. A spaced pair of hollow, flat, upright gas burners adapted to receive a food rack therebetween, each burner having a plurality of apertures in its inner wall, the spacing of the apertures increasing toward the top of the burner, the upper portion of said inner wall being imperforate, and staggered baffle plates located one above the other within said hollow burner and having their ends alternately spaced from opposite edges of the hollow burner, and means for admitting gas to the lower portion of the burner.

KENNETH O. ZEIGLER.
JACOB B. ZEIGLER.